(12) United States Patent
Nishiyama et al.

(10) Patent No.: US 7,388,892 B2
(45) Date of Patent: Jun. 17, 2008

(54) SYSTEM AND METHOD FOR OPTICALLY POWERING A REMOTE NETWORK COMPONENT

(75) Inventors: Nobuhiko Nishiyama, Painted Post, NY (US); Michael Sauer, Corning, NY (US); Chung-En Zah, Holmdel, NJ (US)

(73) Assignee: Corning Incorporated, Corning, NY (US)

( * ) Notice: Subject to any disclaimer, the term of this patent is extended or adjusted under 35 U.S.C. 154(b) by 344 days.

(21) Appl. No.: 11/015,109

(22) Filed: Dec. 17, 2004

(65) Prior Publication Data
US 2006/0133436 A1  Jun. 22, 2006

(51) Int. Cl.
*H01S 3/00* (2006.01)
(52) U.S. Cl. .................. 372/38.02; 359/145; 398/115
(58) Field of Classification Search ............. 372/6, 372/38.01, 38.1; 359/145
See application file for complete search history.

(56) References Cited

U.S. PATENT DOCUMENTS

| | | | | |
|---|---|---|---|---|
| 6,215,295 B1 * | 4/2001 | Smith, III | ...... | 324/95 |
| 6,525,855 B1 * | 2/2003 | Westbrook et al. | ...... | 398/168 |
| 6,731,880 B2 * | 5/2004 | Westbrook et al. | ...... | 398/115 |
| 2006/0072894 A1 * | 4/2006 | Lalonde | ...... | 385/147 |

* cited by examiner

*Primary Examiner*—Minsun Oh Harvey
*Assistant Examiner*—Tuan N. Nguyen
(74) *Attorney, Agent, or Firm*—Tina N. Thompson; Ronald J. Paglierani

(57) ABSTRACT

Both a system and method for optically powering a network component, such as the transponder of a picocell, is provided. The system includes a vertical cavity surface emitting laser (VCSEL) for processing an input signal, a remotely-located optical power source, and an optical fiber for conducting optical power from the source to the VCSEL. The VCSEL may be electrically biased from current generated by an optical-electro converter coupled to the fiber, or directly optically biased from light from the optical power source. A bias tee is connected between an input signal and an input of the VCSEL such that the VCSEL generates a modulated optical signal. The system may be the transponder of a picocell system where the VCSEL generates an optical uplink signal conducted to a head-end circuit via the same or a separate optical fiber.

22 Claims, 4 Drawing Sheets

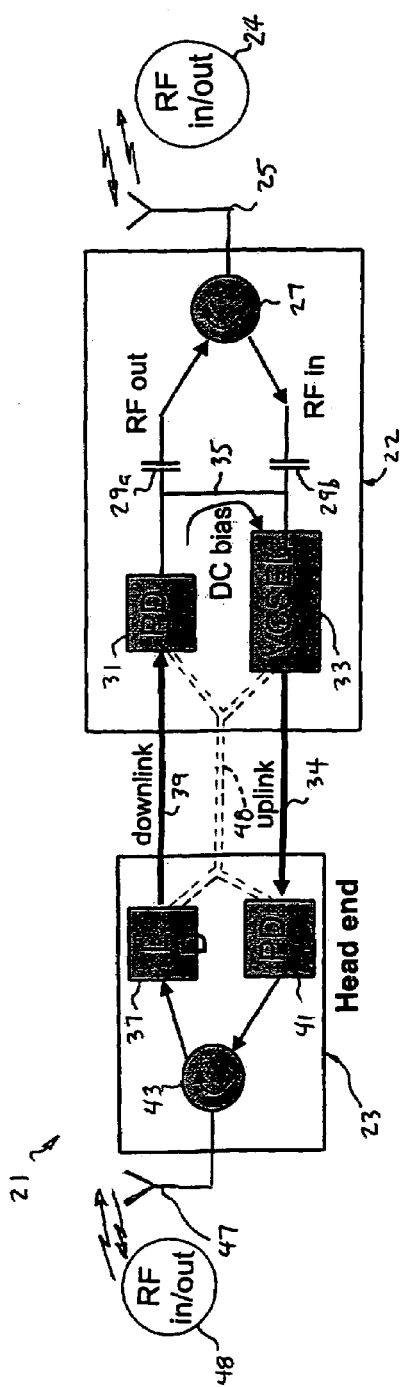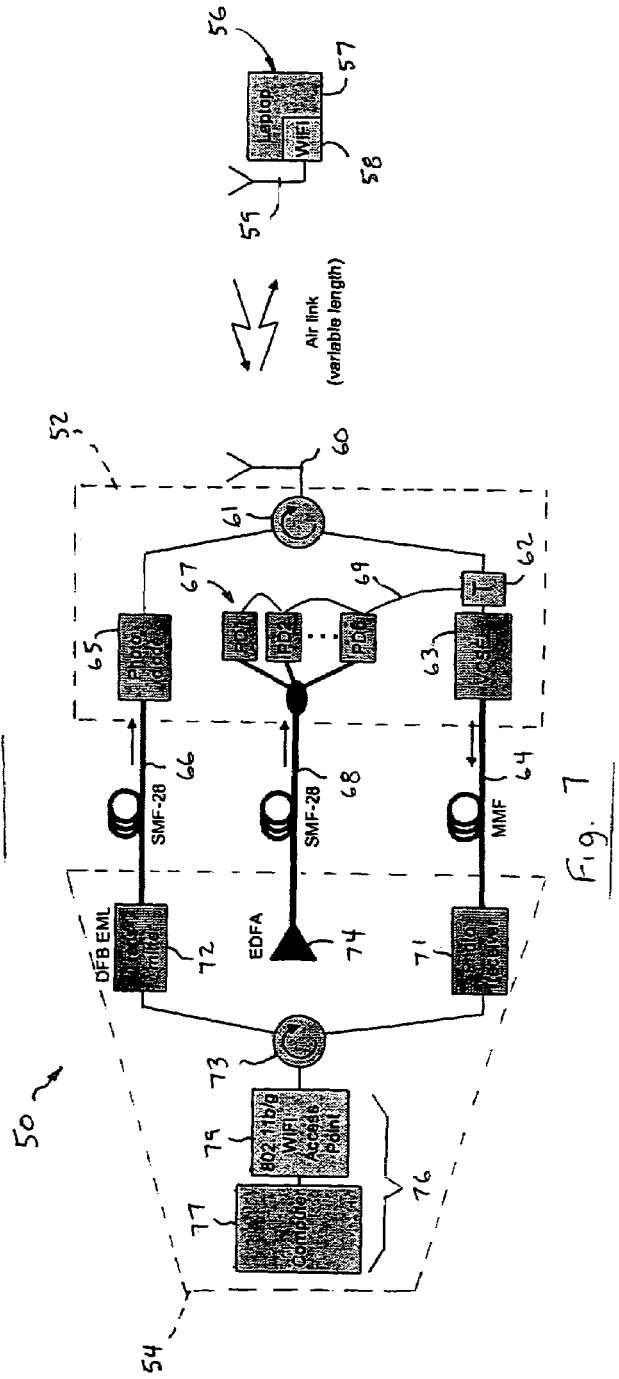

SYSTEM AND METHOD FOR OPTICALLY POWERING A REMOTE NETWORK COMPONENT

FIELD OF THE INVENTION

This invention generally relates to a system and method for optically powering a remotely located component of an optical network, and is specifically concerned with the use of a photo detector array to convert optical power delivered from a remotely located source into electrical power to bias a vertical cavity surface emitting laser (VCSEL) to process an input signal.

BACKGROUND OF THE INVENTION

Optical networks are presently in use in many buildings. Despite their inherently high bandwidth capacity relative to systems based on electrical cables, such networks must often be expanded to keep up with the ever increasing bandwidth demands of improved computer and telecommunications systems. Network expansion typically involves the addition of network components that are remotely located from the central processing unit of the network. In particular, the growth of wireless communication has increased the demand for wireless interfaces with existing office and building-sized optical networks. Around these wireless interfaces, picocells or so-called hot spots are typically created for high-speed wireless data communication. Such interfaces can take the form of transponders that serve as remote antennas which in turn are connected to a central head-end.

Electrical power is necessary to operate the opto-electronic semiconductor devices present in the added network components, whether they take the form of transponders or some other remotely-added equipment. As optical fibers cannot transmit electrical power, some other means for providing electricity to the added components is necessary. The simplest way would be to add additional electrical power lines to the network. However, the remote location of the added components often makes the addition of such power lines difficult and expensive. Another solution might be the use of cable that combines both optical fibers and an electrical power line. While such a solution would be less expensive than the separate installation of electrical power lines, it would still necessitate the addition of electrical cables.

Passive picocell designs have been proposed using electroabsorption modulators (EAMs). In some of these designs, the EAM is biased by an electrical signal. This can be derived from light received from a remote source of optical power via an optical fiber that is converted into electrical power. Unfortunately, EAMs are relatively expensive, being manufactured in small numbers. Worse yet, EAMs require the use of single mode optical fiber in order to function, whereas most small scale, short distance optical networks use multimode fiber in order to reduce overall system cost. Hence, such a solution again requires (in most cases) the replacement of at least some optical fiber of the system, and is disadvantageously expensive due to the cost of EAMs.

Clearly, what is needed is a system to add new components, such as transponders, to an existing optical network which would not require the separate installation of electrical power lines, or the replacement of any of the existing optical fiber. Ideally, such a system would be relatively easy and inexpensive to implement, and completely compatible with the existing network infrastructure. Finally, such a system should also be capable of implementing whole new building-sized networks utilizing inexpensive multi-mode optical fiber.

SUMMARY OF THE INVENTION

The invention is a system for remotely optically powering a network component that avoids all the aforementioned shortcomings associated with the prior art. To this end, the system of the invention generally comprises a circuit including a VCSEL that is biased by power received from a remotely located optical power source via an optical fiber. In one embodiment, the biasing light received from the remote power source is coupled to an opto-electrical converter such that the VCSEL is biased by electrical power. The opto-electrical converter may be a photodetector array, or a photodiode. In another embodiment, the biasing light is coupled directly to the active region of the VCSEL in order to directly bias it. In either embodiment, the circuit includes a bias tee or other component for modulating the optical output of the VCSEL in accordance with an input signal.

The circuit may comprise the transponder of a picocell system, wherein the VCSEL converts an electrical input signal into an optical uplink signal that is conducted to a head-end circuit via either the power transmitting optical fiber, or a separate optical fiber. The transponder may include a radio frequency circuit that converts a radio signal into an input signal that is used to modulate the biasing current of the VCSEL generated by the optical-electro converter so that the optical output of the VCSEL is modulated into the uplink signal. The head-end circuit may also include a radio frequency circuit that converts a digital baseband signal into a radio frequency signal which is then converted into an optical downlink signal. The head-end circuit may further include an optical power source, such as a light emitting diode (LED) or erbium doped fiber amplifier (EDFA) or laser diode to generate the biasing power. The head-end circuit may simultaneously conduct optical power and the optical downlink signal via the same or different optical fibers in parallel to the transponder. The head-end circuit may further have an opto-electrical converter for converting the optical uplink signal into an electrical uplink signal, and the radio frequency circuit of the head-end circuit may also operate to convert the electrical uplink signal received from the transponder into a digital baseband signal.

The transponder may also include an AC coupling circuit connected to the electrical power generated by the opto-electrical converter for separating the downlink signal from the biasing current and conducting it to the radio frequency circuit of the transponder for transmission. Finally, the head-end circuit and the transponder of the picocell may include electrical circulators or radio frequency (RF) switches between the inputs and outputs of their respective radio frequency circuits to allow non-interfering processing of downlink and uplink signals.

The use of VCSELs biased by electrical power generated by remotely-located optical power sources provides a number of advantages over the prior art. Unlike EAMs, VCSELs are low cost and compatible with both multi-mode and single mode optical fibers. They are easily operated by the amount of power that typically can be transmitted through optical fibers. Additionally, VCSELs may be fabricated to operate within any of the wavelengths currently in use in optical networks, including the 0.85, 1.3, and 1.55 micrometer wavelengths used in high speed networks. Finally, the conversion of optical power provides clean, spike-free electrical power that is immune from electromagnetic and radio frequency interference, thereby enhancing the reliability of the resulting network.

DESCRIPTION OF THE DRAWINGS

FIG. 6 is a schematic diagram of a first embodiment of a passive picocell system employing the circuitry of the invention, and FIG. 7 is a second embodiment of a passive picocell system of the invention.

DETAILED DESCRIPTION OF THE PREFERRED EMBODIMENTS

Figure 1:
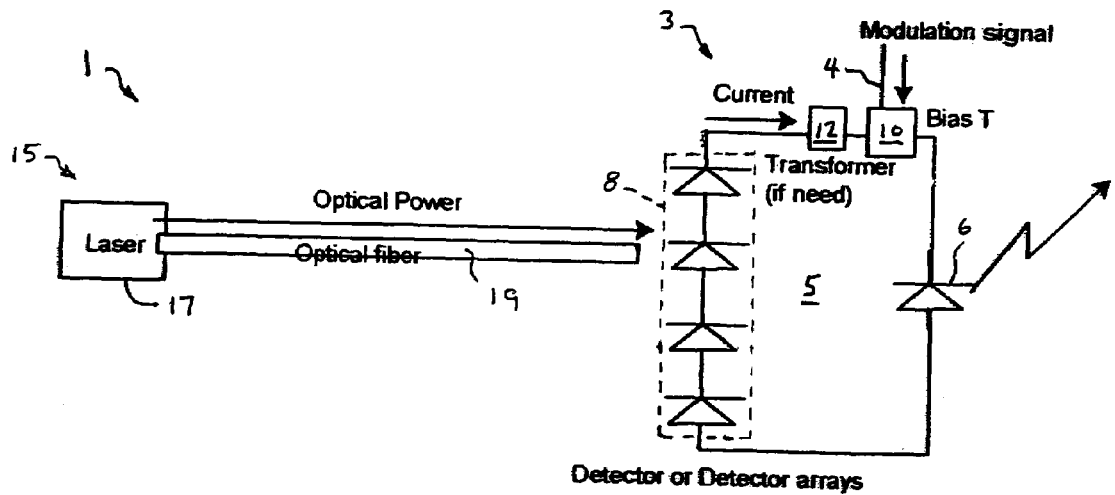
FIG. 1 is a schematic diagram of a first embodiment of the system of the invention.

With reference now to FIG. 1, wherein like numbers designate like components throughout all the several figures, the system 1 of the invention includes a remote component 3 of a network (not shown) that processes an input signal. The remote component 3 includes input signal source 4 connected to a circuit 5 that includes a VCSEL 6, a photodetector array 8 and a bias tee 10. A DC transformer 12 may also be included in the circuit 5 to adjust the voltage versus amperage of the power generated by the photodetector array 8 in order to maximize the photonic output of the VCSEL 6. Accordingly, the use of such a component is generally not preferred.

The system 1 further includes a remote optical power source 15 which in the example of FIG. 1 is formed by a laser light source 17 having an output connected to an optical fiber 19. Fiber 19 in turn is optically coupled to the photodetector array 8. The optical power source 17 may be formed from any one of a number of commercially-available components, such as a laser diode, an erbium-doped fiber amplifier (EDFA) or a light emitting diode, so long as it is capable of delivering at least three and preferably six or more milliwatts of power through the optical fiber 19 to the photodetector array 8.

In operation, laser light generated by the laser light generator 17 is transmitted to the photodetector array 8 via the optical fiber 19, as previously indicated. The photodetector array 8 in turn generates a DC current which is sourced to the VCSEL 6 in order to bias it. The biasing current is modulated by the action of the modulated input signal on the inductor and capacitor (not shown) included within the bias tee 10. By providing the modulated bias current to the VCSEL, 6, the VCSEL's optical output signal is likewise modulated.

Figure 2:
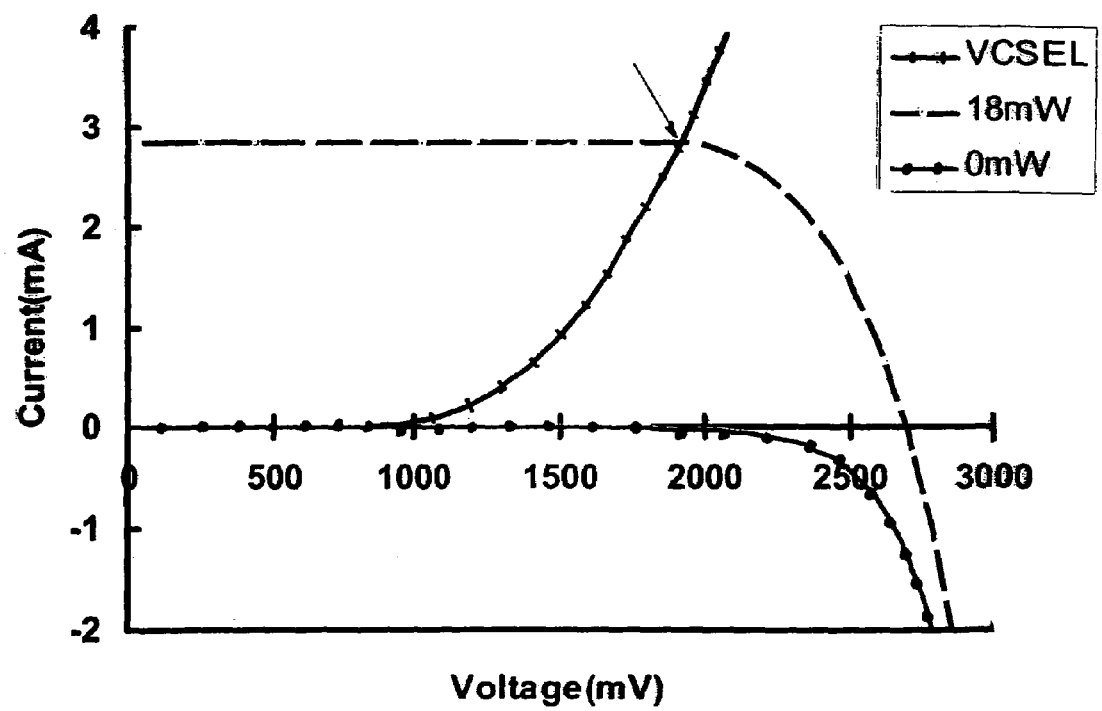
FIG. 2 is a graph illustrating how the current-voltage characteristics of a VCSEL and of a photodetector array may be matched in order to maximize the photonic output of the VCSEL.

FIG. 2 illustrates the importance of adjusting the current-voltage of the biasing current in order to maximize the light output of the VCSEL. The rising graph illustrates the current-voltage characteristics of, for example, a typical 1.3 micrometer VCSEL. The upper graph illustrates combinations of current and voltage that can be generated by a typical photodetector array formed by, for example, six indium-gallium-arsenide detectors connected in series. Optical output of the VCSEL is maximized at the intersection of these two graphs, indicated by the arrow. Accordingly, the optical output of the VCSEL is maximized at a current of approximately 2.8 milliamps at approximately two volts. The photodetector array 8 may be adjusted to provide such a combination of current and voltage by either the addition or subtraction of different types of photodetectors, or by the use of a DC transformer 12 as is illustrated FIG. 1. However, the use of such DC transformers is generally not preferred, as some of the power generated by the photodetector array would have to be used to power this component. Such DC transformers 12 are commercially available semiconductor components which, by themselves, form no part of the instant invention.

Figure 3:
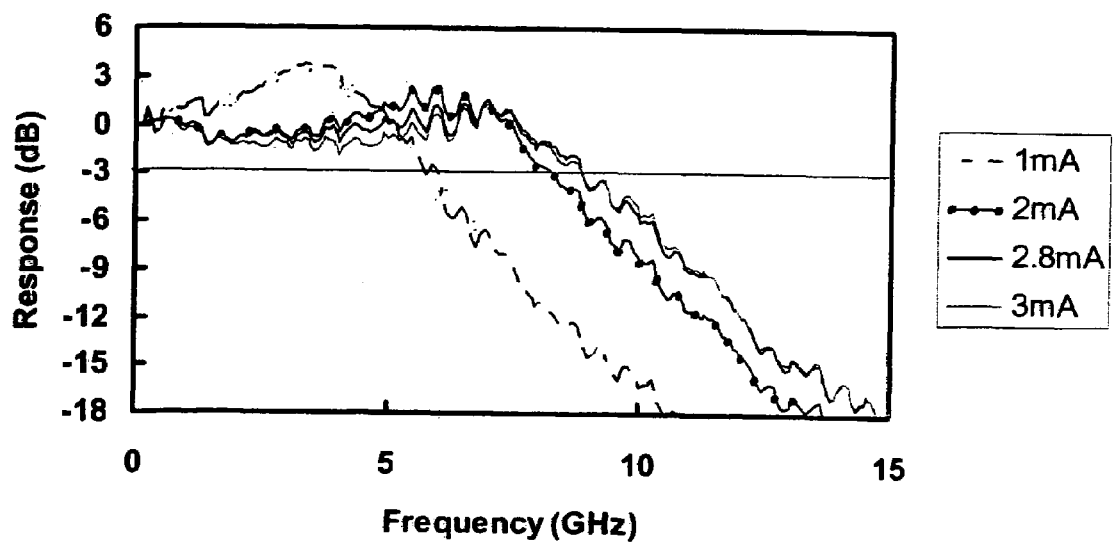
FIG. 3 illustrates how the modulation bandwidths of a VCSEL increases with different biasing currents.

FIG. 3 illustrates how the modulation bandwidth increases as the biasing current is increased to the VCSEL. When the biasing current is at one milliamp, the response is reasonably positive up through approximately 6.0 gigahertz, but then falls off sharply below minus 3 decibels after that. Two milliamps substantially improves performance, with the frequency increasing to approximately 8.0 gigahertz, before the response falls off to under minus 3 decibels. The use of 2.8 milliamps and 3 milliamps allows the VCSEL to operate at a frequency of 8.6 gigahertz before the response falls off to minus 3 decibels. In view of the almost identical curve traced by 2.8 milliamps and 3 milliamps, the graph of FIG. 3 indicates that a current of 2.8 milliamps is optimal in order to obtain a maximum modulation bandwidth from a VCSEL as additional a mounts of current do not result in any significant bandwidth increase.

Figure 4:
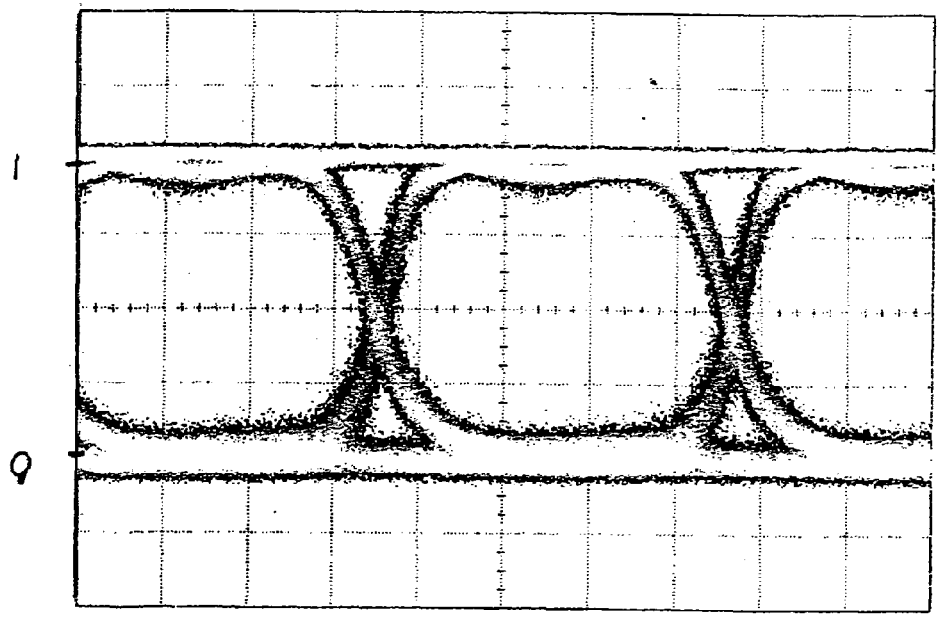
FIG. 4 is an "eye" diagram of the photonic output of a 1.30 micrometer VCSEL biased in accordance with the schematic diagram of FIG. 1, illustrating in particular the sharp definition between digital ones and zeros at a data rate of 2.4 gigabits per second.

FIG. 4 illustrates the ability of the VCSEL 6 to transmit unambiguous and error free digital information when operated within the system 1 illustrated in FIG. 1. Specifically, this diagram illustrates how a VCSEL operating within the FIG. 1 configuration at a biasing current of 2.8 milliamps and approximately 2.0 volts can generate error free data transmission at a rate of 2.4 gigabits per second. This is a particularly impressive result when one considers that other types of semiconductor edge-emitting lasers would require approximately six or seven times as much power (i.e., between 30 and 40 milliwatts) in order to transmit data error free at the same rate as that illustrated in FIG. 4.

Figure 5A:
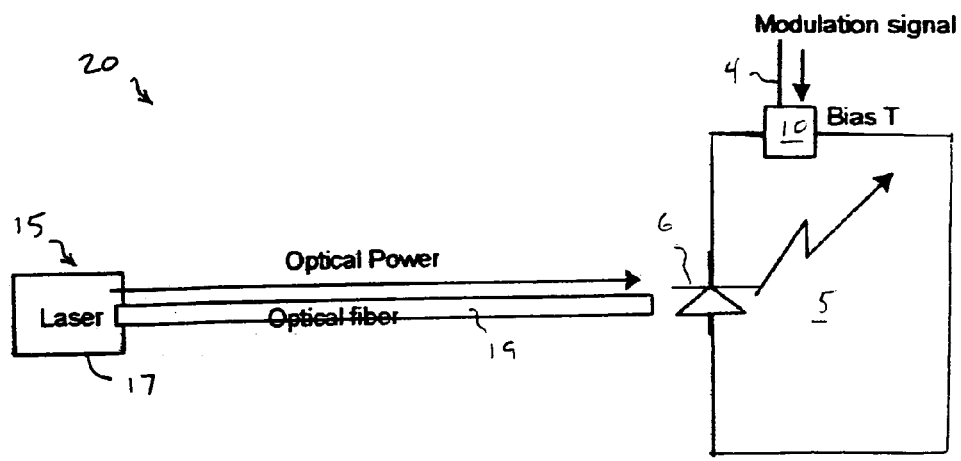
FIG. 5A is a second embodiment of the system of the invention illustrating how the photodetector array of the circuit of FIG. 1 may be eliminated, and how the VCSEL may be biased directly by optical power.

FIG. 5A illustrates a second embodiment 20 of the system of the invention. In this embodiment, the further detector array 8 has been eliminated, and the VCSEL 6 is directly optically pumped by the output of the laser light generator 17 of the optical power source 15. Such optical pumping may be accomplished if light of a shorter wavelength is directed into the active region of the VCSEL 6. For example, if the VCSEL 6 generates 1.30 micrometer laser light when biased, then the light generated by the pumping laser 17 should have a wavelength of approximately 1.2 micrometers or less.

Figure 5B:
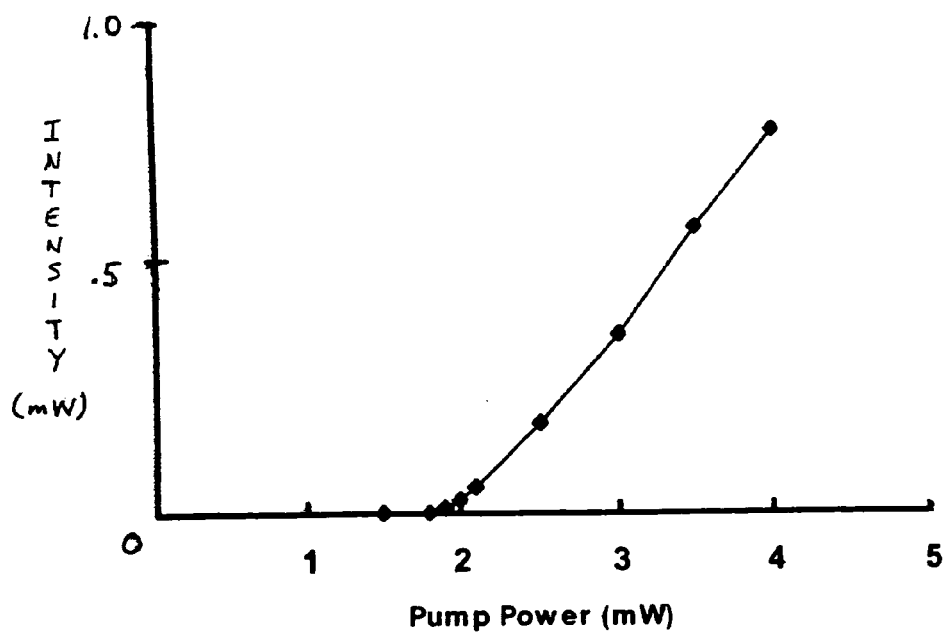
FIG. 5B is a graph illustrating the optical output of the VCSEL as milliwatts of intensity versus milliwatts of incoming laser pump power.

FIG. 5B illustrates that the relative power efficiencies between electrical and optical pumping are substantially the same. For example, if the pump power is 4.0 milliwatts, then the resulting intensity of the 1.3 micrometer laser light from the VCSEL 6 would be approximately 0.80 milliwatts. While not specifically shown in the drawings, the optical output of the VCSEL 6 might easily be separated from the optical pump power transmitted through the optical fiber 19 by the combination of a filter or a Bragg grating and optical circulator or fiber coupler. Several other techniques for separating the optical downlink signal from the power signal exist. The embodiment of the system 1 of FIG. 5A is advantageously simpler and less expensive, requiring only that the laser light generator 17 produce pumping light at a shorter wavelength than the optical output of the VCSEL 6.

FIG. 6 schematically illustrates a picocell system 21 that embodies the invention. The system 21 generally comprises a transponder 22 remotely connected to a head-end circuit 23 via at least one optical fiber.

The transponder 22 both receives and transmits data from a radio frequency transceiver source 24 via antenna 25. Antenna 25 is connected to a circulator 27 which functions to prevent interference between uplink and downlink signals during the operation of the system 21. Such circulators are formed from a ferrite material and include three terminals that allow radio frequency to flow between any two adjacent ports in one direction only. Such devices are known in the prior art and per se form no part of the present invention. One port of the circulator 27 is connected to a photodetector 31 by way an AC coupling 29a, while the other port of this component is connected to a VCSEL 33 via AC coupling 29b. The VCSEL 33 is optically coupled to the head-end circuit 23 via optical fiber 34 which is preferably a multi-mode fiber. A bias current conductor 35 conducts biasing current generated by the photodetector 31 to the VCSEL 33.

The head-end circuit 23 includes a source 37 of light which may be a laser, an EDFA or an LED. Source 37 is remotely connected to the photodetector 31 of the transponder 22 via optical fiber 39. Head-end circuit 23 further includes a photodetector 41 whose input is remotely connected to the output of the VCSEL of the transponder 22 via the previously mentioned optical fiber 34. Both the source 37 of light and the photodetector 41 are connected to two of the three ports of another circulator 43. The third port of the circulator 43 is connected to an antenna 47. The antenna 47 both receives and transmits data from the radio frequency transceiver 48.

In operation, the transmission of downlink and uplink signals between the transponder 22 and head end circuit 23 often occurs in a time-duplex fashion. When a downlink signal is to be transmitted, the radio transmission 48 converts a digital base band downlink signal into a radio frequency signal, which is transmitted to the antenna 47. The circulator 43 conducts the radio frequency signal to an input of the source 37 of laser light in order to modulate its optical output and create an optical downlink signal. The optical downlink signal is transmitted via optical fiber 39 to the photodetector 31 of the transponder 22, which in turn converts the optical downlink signal into a radio frequency downlink signal. The radio frequency downlink signal is in turn conducted to the circulator 27 via AC coupling 29a, where it is transmitted through the antenna 25 to the radio frequency transceiver 24. In this manner, the downlink signal from radio frequency transmission 48 is transmitted to the radio frequency transceiver 24.

When the picocell system 21 is used to transmit an uplink signal from the radio frequency transceiver 24 to transceiver 48, the source 37 of laser light transmits a biasing signal via optical fiber 39 to the photodetector 31 in order to generate a biasing current. The biasing current is in turn conducted into the VCSEL 33 via conductor 35. At the same time, radio frequency transceiver 24 transmits an uplink signal which is received by the antenna 25 and conducted into the AC coupling 29 via circulator 27. The time-varying electrical charge generated in the AC coupling 29b from the uplink radio frequency signal is applied to the input of the VCSEL 33 such that its optical output is modulated in accordance with the radio frequency uplink signal. The resulting optical uplink signal is in turn transmitted to the photodetector 41 of the head-end via the optical fiber 34, and from thence to the antenna 47 via circulator 43 to the radio frequency transceiver 48.

While the picocell system 21 is illustrated as having two optical fibers 34 and 39 for uplink and downlink signals, respectively, it may also employ only a single optical fiber 48 (indicated in phantom) which is bifurcated at either end to connect with the photodetector 34 and VCSEL of the transponder and the laser light source 37 and photodetector 41 of the head-end circuit 23. Additionally, while the operation of the picocell system as has been described in time-duplex terms, this same architecture could also operate via frequency duplex where uplink and downlink signals are transmitted simultaneously on different frequency bands.

FIG. 7 illustrates a second embodiment 50 of a picocell system of the invention likewise including a transponder 52, and a head-end circuit 54. At the transponder end of this system 50, a radio frequency transceiver 56 formed from the combination of a laptop computer 57 in a wifi card 58 transmits a downlink radio signal. The transponder 52 includes an antenna 60 connected to a circulator 62 whose remaining two ports are respectively connected to a bias-tee circuit 62 which in turn is connected to the input of the VCSEL 63, and a photodiode 65. The optical output of the VCSEL 63 is coupled to an uplink optical fiber 64. The optical input of the photodiode 65 is coupled to a downlink optical fiber 66. The transponder 52 further includes a photodetector array 67 whose input is coupled to a bias optical fiber 68, and whose electrical output is connected to the bias-tee 62 via conductor 69.

Turning next to the head-end circuit 54 of the system 50, circuit 54 includes a photo receiver 71 coupled to the other end of the uplink optical fiber 64, and an optical transmitter in the form of a DFB-ld coupled to the downlink optical fiber 66. An erbium doped fiber amplifier (EDFA) 74 is coupled to the input of the bias current optical fiber 68 in order to power the photodetector array 67 of the transponder. Both the output of the photo receiver 71 and the input of the optical transmitter 72 are connected to two of the three ports of a circulator 63. The remaining port is connected to the output of a radio frequency transmitter 76 formed by the combination of a computer 77, and a wifi card 79.

In operation, the wifi card 79 of the radio frequency transceiver 76 was based on the IEEE 802.11 b/g standard. Thus, the frequency of the downlink data rate was 2.4 GHz. The data rate could be read out on the laptop 57 of the radio frequency transceiver 56 or measured from the time file transmission took between the computer and the laptop or vice versa.

While the invention has been described with reference to several preferred embodiments, many variations and modifications of these embodiments will become apparent to those skilled in the art. For example, the circulator 43 described with reference to the FIG. 6 embodiment may be eliminated in alternate designs. The antenna interfaces shown on the head-end circuits 23 and 54 of the FIGS. 6 and 7 embodiments may also be eliminated, and these circuits 23 and 54 may be directly wired to a backbone network such as the internet or a corporate intranet. All such variations and modifications are intended to fall within the scope of the invention, which is limited only by the language of the claims and equivalents thereto.

What is claimed is:

1. A system for optically powering a network component that processes an input signal, comprising:
   a circuit including a VCSEL;
   an optical power source located remotely with respect to said circuit;

an optical fiber coupled to said power source that conducts optical power to said circuit, and an optical-electro converter for converting optical power from said power source via said fiber into a biasing current, wherein said VCSEL is biased by said biasing current generated by light from said optical power source and includes an input that receives said input signal and an output that provides an optical output signal, and wherein said circuit further includes and a bias tee connected to said biasing current, said input signal and said VCSEL input such that said output is a beam of modulated laser light generated by said VCSEL.

2. The system defined in claim 1, wherein said optical-electro converter is a photo detector array.

3. The system defined in claim 1, wherein the optical fiber delivers over 1 milliwatt of optical power to said circuit.

4. The system defined in claim 1, wherein the optical-electro converter generates between 2 and 3 milliamps at between 0.5 and 4.0 volts.

5. The system defined in claim 1, wherein the optical fiber is a multimode fiber.

6. The system defined in claim 1, wherein the VCSEL is between 0.6 and 1.6 micrometer wavelength VCSEL.

7. The system defined in claim 1, wherein a voltage and an amperage generated by the optical-electro converter is variable.

8. The system defined in claim 1, wherein said circuit includes a radio frequency circuit that converts a radio signal to said input signal.

9. The system defined in claim 8, wherein said circuit is a transponder, said VCSEL output generates an uplink signal.

10. The system defined in claim 9, wherein said VCSEL generates an optical uplink signal, and further comprising a second optical fiber that conducts said uplink signal to a head-end circuit of a picocell system.

11. The system defined in claim 9, wherein said optical fiber conducts an optical downlink signal, and said optical-electro converter converts said optical downlink signal to an electrical downlink signal.

12. The system defined in claim 11, wherein said radio frequency circuit converts said electrical downlink signal into a radio signal.

13. The system defined in claim 12, wherein said circuit further includes one of a circulator and radio frequency switch that connects said electrical downlink signal and said input signal to an input and output of said frequency circuit.

14. The system defined in claim 13, wherein said circuit includes first and second AC couplings for connecting said electrical downlink signal to said circulator or radio frequency switch and said input signal to said VCSEL, respectively.

15. An optically powered network component, comprising:
a circuit including a VCSEL; and, an optical-electro converter that converts optical power into electrical power;

a first optical fiber that conducts remotely generated optical power to said optical-electro converter such that said VCSEL is biased by electrical power generated by said converter and converts an electrical uplink signal into an optical uplink signal, a radio frequency circuit that receives a radio signal and converts it into said electrical uplink signal, and a third optical fiber that conducts an optical downlink signal to a second optical-electro converter that generates an electrical downlink signal, wherein said circuit includes a bias tee connected to said biasing current, said electrical downlink signal and an input of said VCSEL.

16. The system defined in claim 15, wherein said optical power generated by said optical-electro converter includes a downlink signal such that said electrical power generated by said optical-electro converter includes a biasing current modulated by said electrical downlink signal, and 17. The system defined in claim 16, wherein said radio frequency circuit receives said electrical downlink signal and converts it into a radio signal.

18. The system defined in claim 15, wherein said radio frequency circuit receives said electrical downlink signal and converts it to a radio signal.

19. The system defined in claim 15, wherein said other network component is a head-end circuit of a picocell system.

20. The system defined in claim 19, wherein said head-end circuit includes a second radio frequency circuit that receives a second radio signal and converts it into an electrical downlink signal.

21. The system defined in claim 20, wherein said head-end circuit includes an electro-optical converter that converts said electrical downlink signal into an optical downlink signal that is transmitted to said first network component via said first optical fiber.

22. An optically powered network transponder of a picocell system, comprising:

an optical-electro converter that converts light into a biasing current;

a first optical fiber that conducts said light from a head-end circuit to said optical-electro converter;

a VCSEL biased by said biasing current that generates an optical uplink signal, and a second optical fiber that conducts said optical uplink signal from said VCSEL to a head-end circuit of said picocell system, wherein said circuit includes a bias tee connected to said biasing current and an input of said VCSEL.

* * * * *